US010124631B2

(12) United States Patent
Serret Avila et al.

(10) Patent No.: US 10,124,631 B2
(45) Date of Patent: Nov. 13, 2018

(54) DYNAMIC TIRE PRESSURE REGULATOR FOR BICYCLES

(71) Applicant: VERSEC SPRL, Uccle (BE)

(72) Inventors: Javier Serret Avila, Uccle (BE); Mathijs Verstraete, Leuven (BE)

(73) Assignee: VERSEC SPRL, Uccle (BE)

( * ) Notice: Subject to any disclaimer, the term of this patent is extended or adjusted under 35 U.S.C. 154(b) by 62 days.

(21) Appl. No.: 15/115,844

(22) PCT Filed: Feb. 3, 2015

(86) PCT No.: PCT/EP2015/052126
§ 371 (c)(1),
(2) Date: Aug. 1, 2016

(87) PCT Pub. No.: WO2015/114153
PCT Pub. Date: Aug. 6, 2015

(65) Prior Publication Data
US 2017/0015148 A1    Jan. 19, 2017

(30) Foreign Application Priority Data

Feb. 3, 2014    (EP) .................................... 14153678
Oct. 8, 2014    (EP) .................................... 14188149

(51) Int. Cl.
*B60C 23/00*    (2006.01)
*B60C 23/12*    (2006.01)
*F04B 45/04*    (2006.01)

(52) U.S. Cl.
CPC ............ *B60C 23/004* (2013.01); *B60C 23/12* (2013.01); *F04B 45/04* (2013.01); *B60C 2200/12* (2013.01)

(58) Field of Classification Search
CPC ... B60C 23/004; B60C 23/12; B60C 2200/12; F04B 45/04
(Continued)

(56) References Cited

U.S. PATENT DOCUMENTS 4,546,990 A * 10/1985 Harriger ................ B62M 19/00
280/216
4,651,792 A * 3/1987 Taylor .................... B60C 23/12
141/198

(Continued)

FOREIGN PATENT DOCUMENTS

CH        233710 A * 8/1944 ............ B60C 23/12
DE        4010711 A    10/1991
(Continued)

OTHER PUBLICATIONS

International Preliminary Report on Patentability from the International Bureau of WIPO dated Aug. 9, 2016 in International Application No. PCT/EP2015/052126 filed Feb. 3, 2015.
(Continued)

*Primary Examiner* — S. Joseph Morano
*Assistant Examiner* — Jean W Charleston
(74) *Attorney, Agent, or Firm* — The Marbury Law Group, PLLC

(57) ABSTRACT

A wheel hub assembly of a bicycle wheel is disclosed that include a wheel axle, a rotary pump that may be composed of a pump housing, a pump rotor, a first fluid port configured for fluidly coupling to a pneumatic tire and a second fluid port configured for fluidly coupling to a fluid reservoir. The assembly allows for conveniently and efficiently modifying the tire pressure in bicycles at will while riding, in as many cycles as desired and without contaminating the air inside the tires.

23 Claims, 9 Drawing Sheets

(58) Field of Classification Search
USPC .................. 152/415, 416, 417, 418, 419
See application file for complete search history.

(56) References Cited

U.S. PATENT DOCUMENTS

| | | | |
|---|---|---|---|
| 5,143,370 A * | 9/1992 | Richards | A63B 49/022 473/457 |
| 5,318,317 A * | 6/1994 | Hopper | B60C 23/105 152/416 |
| 5,342,177 A * | 8/1994 | Cheng | B60C 23/12 152/419 |
| 7,124,789 B2 * | 10/2006 | Nakano | B60C 23/12 141/38 |
| 7,581,576 B2 * | 9/2009 | Nakano | B60C 23/12 152/419 |
| 2004/0216827 A1 | 11/2004 | Stanczak | |
| 2009/0096184 A1 * | 4/2009 | Krudenscheidt | B60C 23/105 280/201 |

FOREIGN PATENT DOCUMENTS

| | | |
|---|---|---|
| EP | 0621144 A1 | 10/1994 |
| EP | 1473177 A1 | 11/2004 |
| WO | 2013/075675 A1 | 5/2013 |

OTHER PUBLICATIONS

International Search Report from the European Patent Office in International Application No. PCT/EP2015/052126 dated Apr. 24, 2015.
Written Opinion of the International Searching Authority in International Application No. PCT/EP2015/052126 dated May 11, 2015.

* cited by examiner

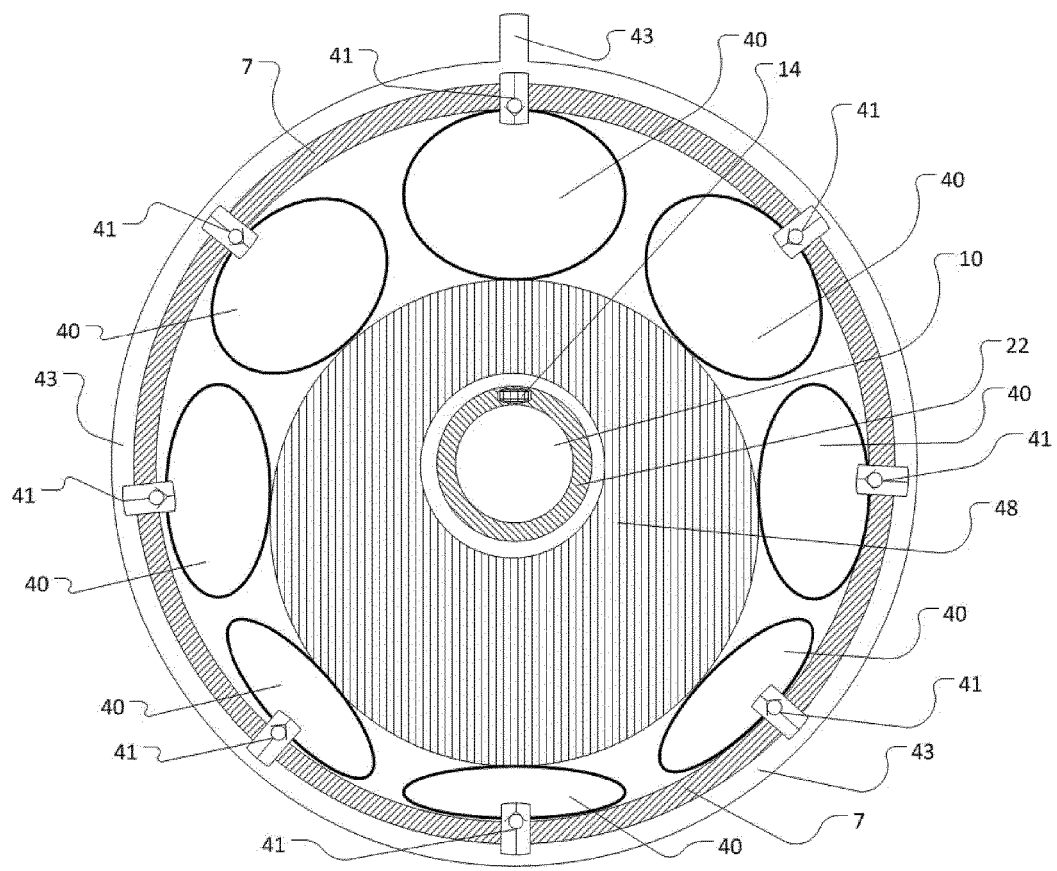
FIG 9: III-III

DYNAMIC TIRE PRESSURE REGULATOR FOR BICYCLES

RELATED APPLICATIONS

This application is the U.S. national phase entry under 35 U.S.C. § 371 of PCT Application No. PCT/EP2015/052126, filed Feb. 3, 2015, which claims the priority benefit of European Patent Application No. EP14153678, filed Feb. 3, 2014 and European Patent Application No. EP14188149 filed Oct. 8, 2014. Applications PCT/EP2015/052126, EP14153678 and EP14188149 are incorporated herein by reference in their entirety.

The present invention is related to the technical field of devices for regulating pressure in wheels with pneumatic tires.

More particularly, the present invention is in the technical field of devices allowing regulating the pressure of the pneumatic tires on bicycles while riding them.

BACKGROUND OF THE INVENTION

Although there are numerous examples of prior art in this field, such as WO 2013/075675, the current invention overcomes major flaws that have prevented them from widespread use in the field of bicycles featuring large tires until now. Most of the current state of the art concentrates in making sure the tire is inflated to an adequate pre-selected pressure by:

Step 1: Acquiring air from the atmosphere and adding into the tire using a pump or similar mechanical device; or acquiring air from a pre-pressurized reservoir and adding it into the tire using valve or similar regulation device:

Step 2: If necessary, releasing back air into the atmosphere should the tire become over-inflated using a valve or similar regulation device.

Step 1 is by far the most complex and numerous designs to address it exist. These include piston-based valves inserted into the hub, rim or directly within the tire itself. These designs concentrate in achieving the pre-set minimal pressure while minimizing overall system weight, complexity and mechanical load to the rider. Moreover, this step is also implemented in numerous different designs in similar applications for cars, trucks, agricultural and industrial transport systems.

Step 2 is usually much simpler and in most cases only includes an air-release valve with a preset maximum tire pressure (placed in the rim or hub). In car and truck applications, a more complex system may exist with the ability to manage the pre-set maximum tire pressure while riding the vehicle, either by pure mechanical or electronically controlled means.

Modern bicycles, and in particular mountain bikes, have been incorporating increasingly large tires across the years, currently featuring tires with rim diameters of 622 mm or more and/or tire-width of 5" or more. Although these large tires may seem inefficient and awkward to ride for those not versed in the state of the art, when set at relatively low pressures, they provide for much more energy efficient, controllable and comfortable riding over rugged terrain when compared to thin and high pressure tires. Moreover, these tires can be mounted in "tubeless" configuration, which prevents most flats and further allowing lower pressures.

However, the large tires and very low pressures make them relatively inefficient when riding over smooth terrain. To overcome this, a rider will need to increase the tire air pressure. Actually, the larger the tire, the more the pressure-efficiency balance between rugged and smooth terrain becomes sensitive, and in many circumstances, it is impossible to pre-set the tire at an ideal pressure given the typical mixed-terrain circuits where these mountain bikes are usually ridden.

Therefore, incorporation of a tire-pressure regulation device will be a priori extremely convenient in these mountain biking applications; however, none of the existing state of the art has achieved any significant usage in this fields because:

In mountain biking applications it is impractical to filter efficiently the incoming atmosphere air given the variety of riding circuits featuring large quantities of dust, dirt and mud;

It is impractical to incorporate reservoirs featuring large capacity of highly compressed air, and when these are incorporated, only a few full inflation cycles can be achieved given the relatively large size of the tires;

Alternative liquefied-$CO_2$ based reservoirs have a similar cycle-limitation, and they are not compatible with most tubeless systems because $CO_2$ "corrupts" the sealing properties of the dedicated sealing liquid incorporated inside these tires;

When existing, the mechanically-driven pumps apply mechanical load to the rider either continuously, or at the worst time in the ride, or without direct control of the rider; The systems feature none or limited ability to determine set-tire-pressure without dismounting the bike.

DE 4010711 describes a closed system for application in all-terrain 4-wheeled motor vehicles and already addresses some of the limitations of other systems described in the previous art, namely the ability to control tire pressure without needing to refill air from the atmosphere or an external device. However, the document presents a high degree of mechanical load, it is very heavy as it unbalances the wheel, and it is wholly incompatible with current mountain bike frame, drive train and wheel technologies, and finally, it cannot be directly controlled via mechanical means.

US2004216827A1 describes a tire inflation and pressure maintaining system, whereas in one of its embodiments the step 1 mentioned above is based on a vane pump. However, the vane pump is configured such as the pump rotor is static with respect to the vehicle's main axle and therefore the pump operation cannot be controlled independently of the wheel's motion. This creates continuous mechanical load and it cannot be used as unique single control device to change the tire pressure at will. Also, the invention cannot be directly controlled remotely via mechanical means. And finally, due to the intended field of application, the described embodiments are also wholly incompatible with current mountain bike frame, drive train and wheel technologies.

SUMMARY OF THE INVENTION

According to an aspect of the invention, there is provided a wheel hub assembly of a bicycle wheel as set out in the appended claims. The assembly comprises a wheel axle, a rotary pump comprising a pump housing, a pump rotor, a first fluid port configured for fluidly coupling to a pneumatic tire and a second fluid port configured for fluidly coupling to a fluid reservoir. The assembly further comprises control means (or a control device) for controlling actuation or a mode/state of operation of the assembly, advantageously for changing between the modes or states of operation. The pump is configured for displacing fluid between the first and second fluid ports. The pump rotor is configured for rotating relative to the pump housing coaxially with the wheel axle, and the pump housing is configured for rotating relative to the wheel axle, advantageously coaxially with the wheel axle. When assembled with the wheel, the pump and the fluid ports are advantageously configured to form a closed fluid circuit with the pneumatic tire and the reservoir.

According to an aspect of the present invention, there is provided a dynamic tire pressure regulation device or assembly for bicycles, and specifically for mountain bikes featuring relatively large tires, as set out in the appended claims. The assembly comprises a fluid reservoir configured for mounting on the wheel, concentrically to an axle of the wheel and configured for storing fluid at a pressure higher than the (maximal or rated) pressure in the pneumatic tire. The assembly further comprises a rotary pump comprising a pump housing, a pump rotor, a first fluid port configured for being in fluid communication with the pneumatic tire and a second fluid port configured for being in fluid communication with the reservoir. The pump is configured for displacing fluid between the first and second fluid ports. The assembly comprises control means (or a control device) for controlling actuation or a mode/state of operation of the assembly, advantageously for changing between the modes or states of operation. The pneumatic tire, the reservoir, the pump and the fluid ports are configured to form a closed fluid circuit. The pump rotor is configured for rotating relative to the pump housing coaxially with the wheel axle, and the pump housing is configured for rotating relative to the wheel axle, advantageously coaxially with the wheel axle.

Aspects of the invention encompass a bicycle wheel and a bicycle comprising any of the above assemblies.

Aspects of the invention allow for selecting the desired tire pressure by the rider conveniently from the handlebar while riding via mechanical actuation or electronic control. Aspects of the invention allow for an unlimited amount of tire-pressure changes within a pre-determined pressure range. No mechanical load is created when the tire pressure is held static. According to aspects of the invention, the device or assembly works as an entirely closed system, overcoming air-quality and/or air-volume limitations. As an advantage, devices or assemblies according to the invention can be installed in most existing mountain bikes without modifications to the frame, drive-train or brakes. Finally, as an additional advantage, devices or assemblies according to the invention are relatively lightweight, and do not disrupt the weight balance of the wheel.

Amongst others, aspects of the invention are innovative in "reversing" the mechanical effort in the tire-pressure-regulation steps with respect to existing state of the art for devices intended to be used in bicycles. That is, the relatively difficult step of inflating the tire is made energy free with the trade-off in making the relatively easy step of deflating the tire into requiring positive energy input. The invention is also innovative in its field of application for bicycles in working fully controllable from the handle bar and entirely as closed-air system during its operation while maintaining compatibility with current commercial technologies for bicycle frames, drive-trains, disk and rim brakes and most wheel components.

The innovative working principles of the invention are based on an light-weight container placed within the wheel and containing air at a pressure relatively higher to that existing in the tire, and a triple-action device allowing to: (a) mechanically or electrically pump air from the tire into the reservoir, (b) hold both pressures stable, and (c) freely release air at higher pressure from the reservoir into the tire in a controlled fashion. The control device can be conveniently commanded from the handle-bar mechanically via an actuation cable or electronically in a wirelessly or wired fashion.

BRIEF DESCRIPTION OF THE DRAWINGS

Aspects of the invention will now be described in more detail with reference to the appended drawings, which are illustrative, wherein same reference numerals illustrate same features and wherein:

FIG. 9 is a transverse cross sectional view of the wheel hub body approximately ¼ towards the center of the rear wheel of FIG. 8 along section lines III-III, as seen from the left.

DETAILED DESCRIPTION OF THE INVENTION

Figure 1:
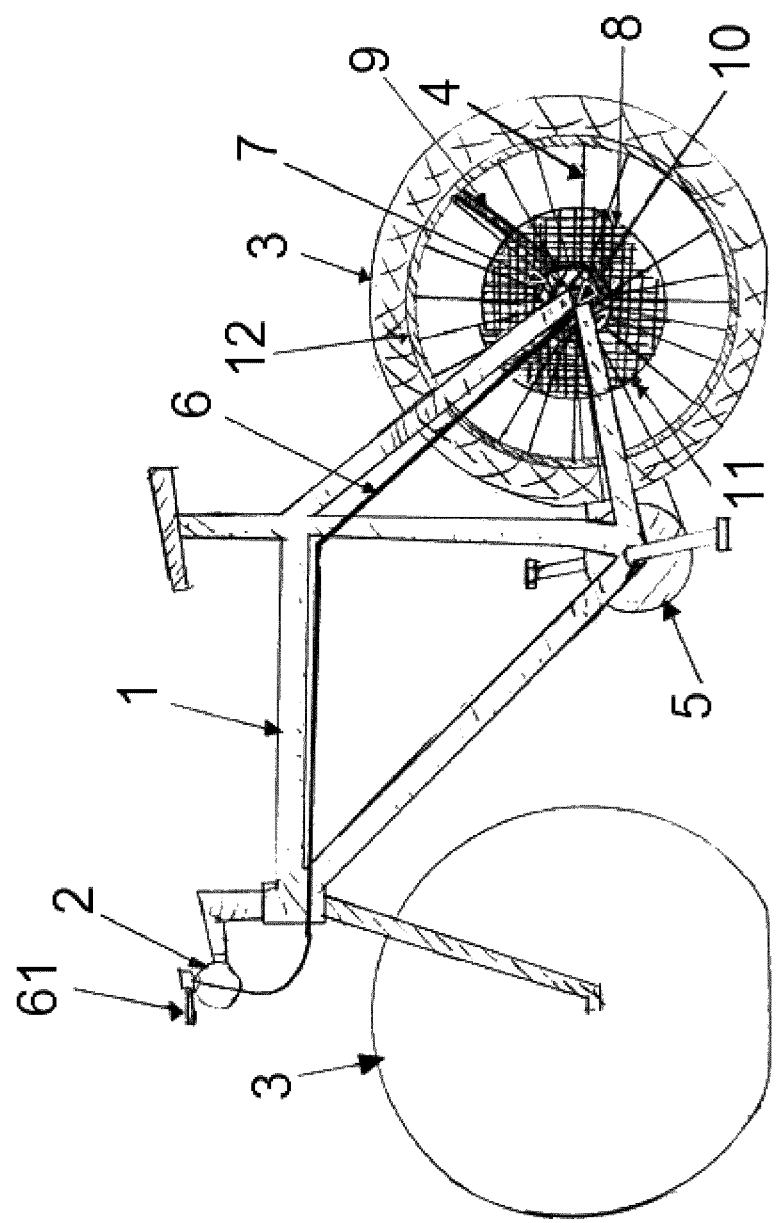
FIG. 1 is a left-hand side view with a general overview of the placement of the present invention within a bicycle according to a first embodiment and when used only for the back wheel.

Referring now to the invention in more detail, in FIG. 1 there is shown a bicycle in a mountain-biking oriented design depicting the major components relevant to this invention in its first embodiment. There is shown frame 1 with handlebar 2, front and back tires 3. The back wheel is detailed further in spokes 4, main axle 10, rim 12, central hub body 7, air reservoir 8, main system air inlet 11, and air-conduct 9. The central hub 7 with regulation pump is controlled via control cable 6, which itself is conveniently actuated via 3-position handle 61. Drive train 5 is included for illustration purposes only.

Figure 2:
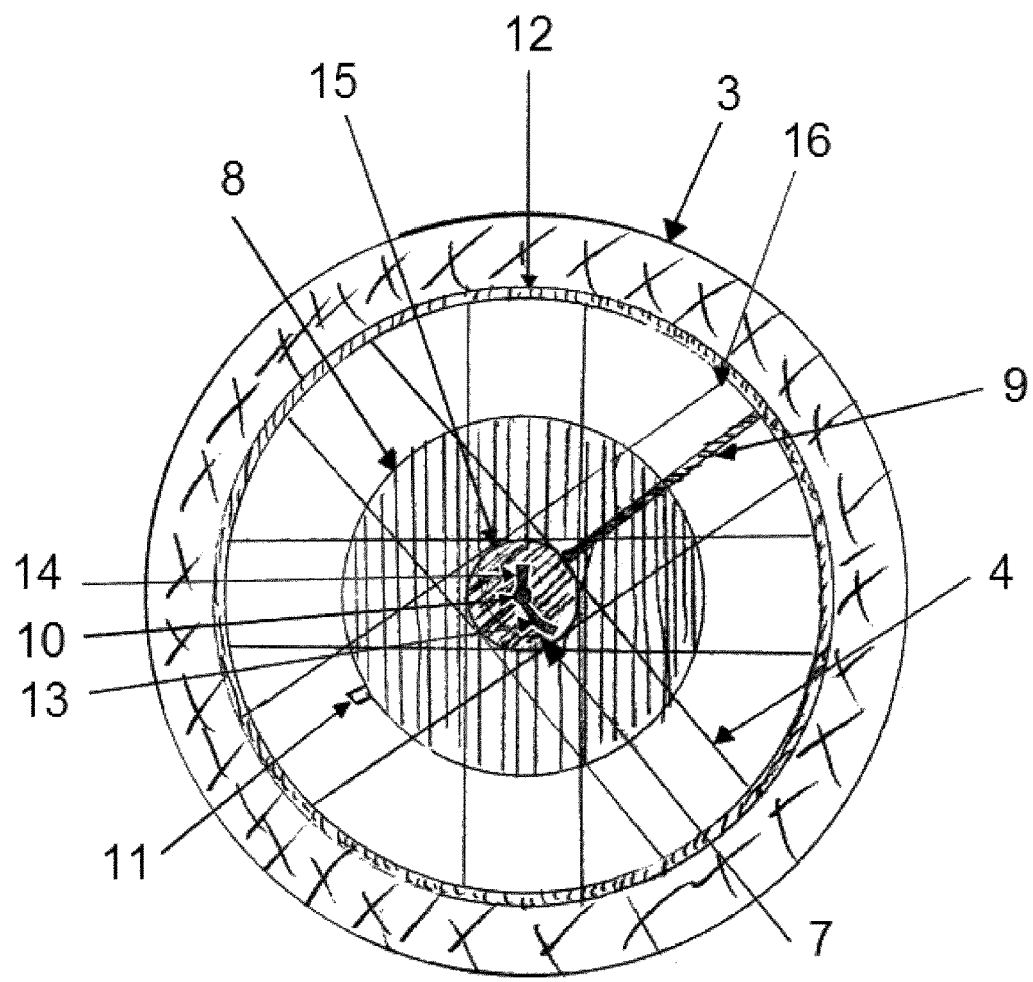
FIG. 2 is a left-hand side view with a general overview of the placement of the present invention in the back wheel in its first embodiment.

In more detail, and referring to the first embodiment of the invention in FIG. 2, there is shown a more detailed left-hand view of the wheel, including (back) tire 3, multiple spokes 4 attached to hub 7 with regulating pump on eyelets 15 and to rim 12 via nipples 16. In between left and right-hand-side spokes, and surrounding hub body 7 there is the air reservoir 8, with system air-inlet valve 11. The hub body 7 is mounted on central axle 10 featuring axle-to-frame lock 13 and pressure control bar 14. Finally the hub body 7 is connected to the tire with air conduct 9 across rim 12.

Figure 3:
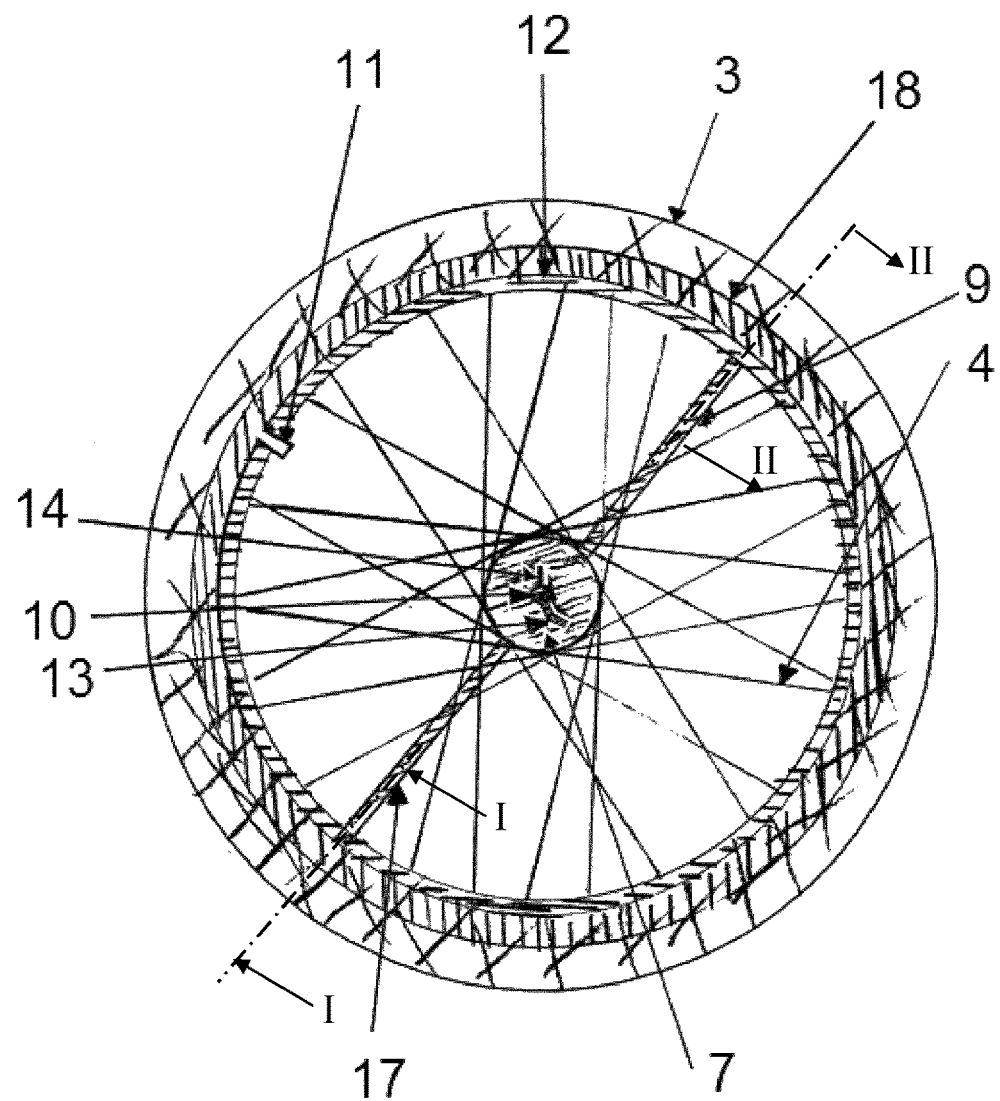
FIG. 3 is a left-hand side view with a general overview of the placement of the present invention in the back wheel in its second embodiment.

Referring to the second embodiment of the invention in FIG. 3, there is shown a more detailed left-hand view of the wheel, including tire 3, multiple spokes 4 attached to hub body 7 on eyelets 15 and to rim 12 via nipples 16. Within the tire 3, and directly on top of the rim 12 there is the air reservoir 18, with system air-inlet valve 11, which goes across rim 12. The hub body 7 is mounted on central axle 10 featuring axle-to-frame lock 13 and pressure control bar 14. Finally the hub body 7 is connected to the tire with air conduct 9 across rim 12, and with the air reservoir 18 with air conduct 17 also across rim 12. The disk brake rotor is not featured for clarity.

Figure 4:
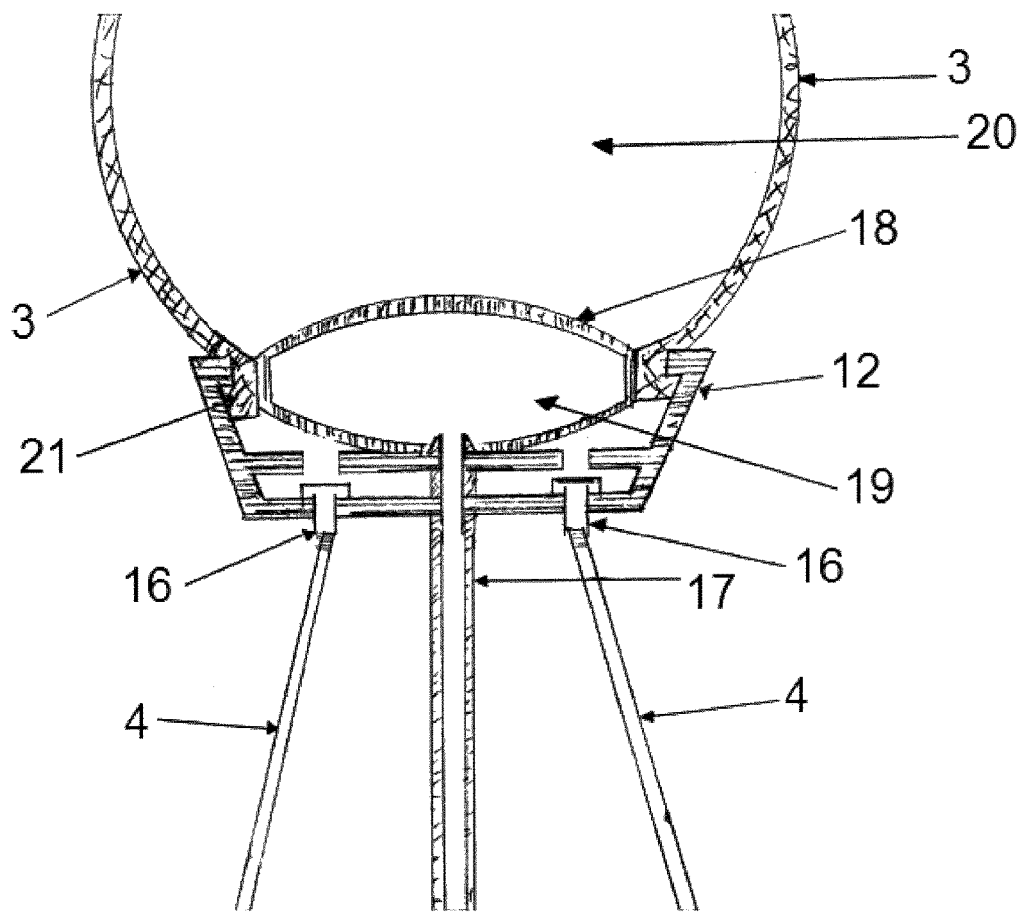
FIG. 4 is a partial cross sectional view along section lines I-I of FIG. 3, representing part of the wheel of the present invention in its second embodiment.

In further detail, and referring to the second embodiment of the invention as shown in FIG. 4, there is shown a cross-section of the "top" of the wheel along section line I-I of FIG. 3, with a partial depiction of tire 3 and its main air chamber 20 mounted on rim 12 using tire-beads 21. Featured inside tire 3, above rim 12 and between tire beads 21, there is air reservoir 18 containing pressurized air 19, itself in direct communication with the hub body 7 (not shown) using air conduct 17. As usual, the rim is mounted on with the help of multiple spokes 4 mounted with nipples 16.

Figure 5:
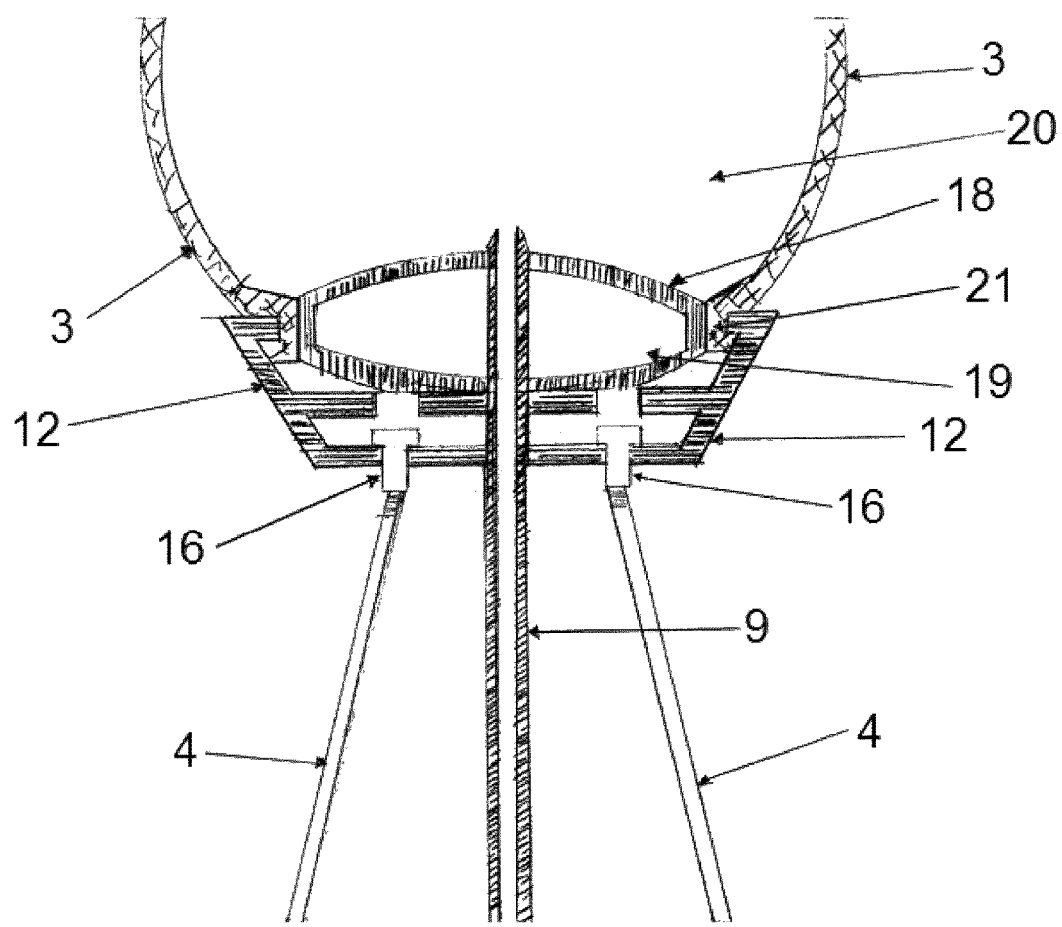
FIG. 5 is a partial cross sectional view along section lines II-II of FIG. 3, representing an opposite part of the wheel depicted in FIG. 4 with the present invention in its second embodiment.

In further detail, and still referring to the second embodiment of the invention, in FIG. 5 there is shown a cross-section of the "bottom" of the wheel along section line II-II of FIG. 3, with a partial depiction of tire 3 and its main air chamber 20 mounted on rim 12 using tire-beads 21. Featured inside tire 3, above rim 12 and between tire beads 21, there is air reservoir 18 containing pressurized air 19. In this case, the tire is in direct communication with the hub body 7 (not shown) using air conduct 9. As usual, the rim is mounted on with the help of multiple spokes 4 mounted with nipples 16.

Figure 6:
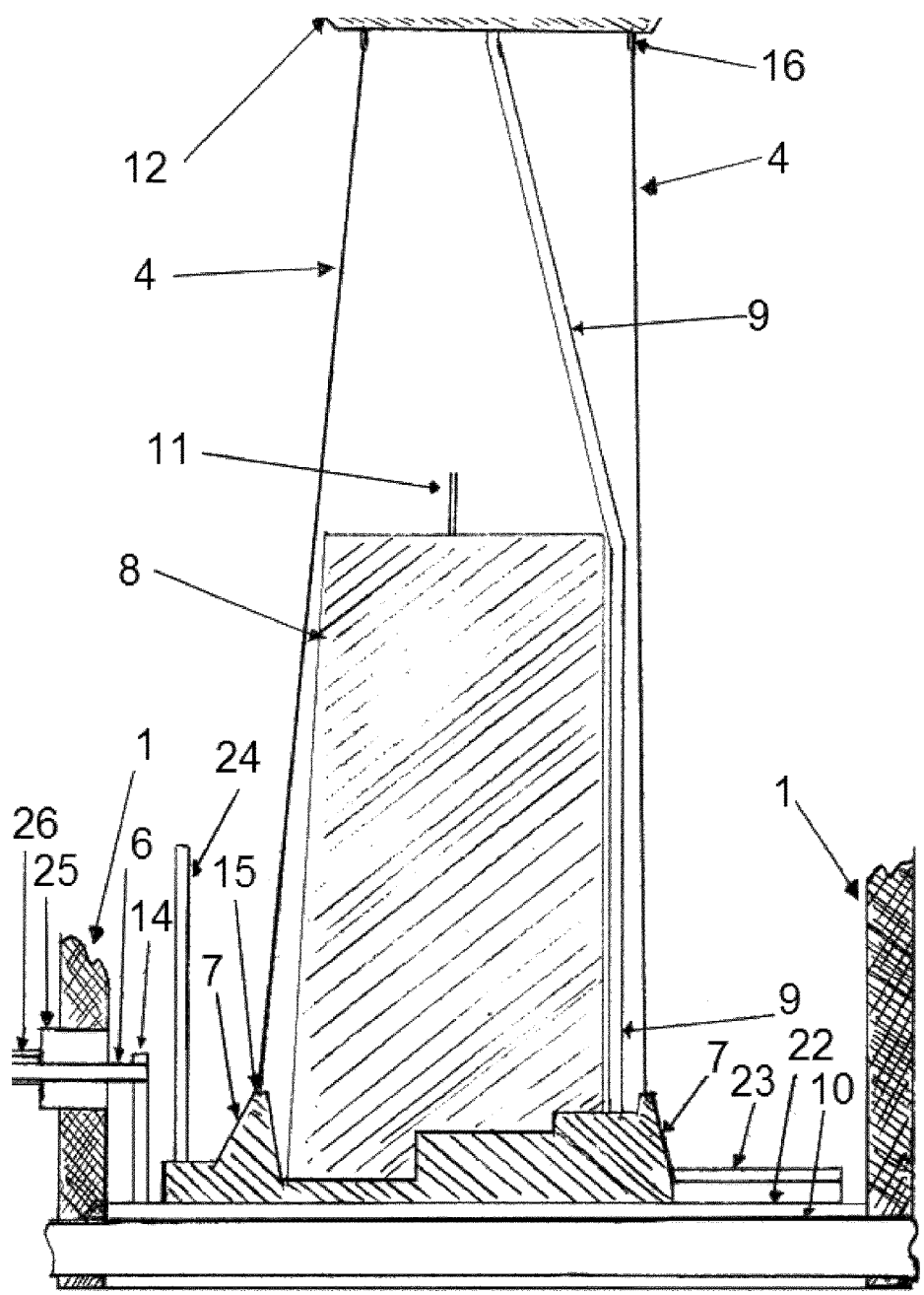
FIG. 6 is a partial cross sectional view of the top-half of the rear wheel as seen from behind with the present invention in its first embodiment and with its mounting on the frame using standardized mechanical interfaces.

In further detail, and referring to the first embodiment of the invention, in FIG. 6 there is shown a cross-section of top-half of the back wheel as seen from behind, with main central wheel axle 10 mounted on frame 1. Over-axle 22 slides on axle 10 and supports the hub body 7 and free-wheel body 23, on top of which are mounted the drive train sprockets (not depicted). Attached to hub body 7 are the disk rotor 24, the spokes 4 across eyelets 15, the air reservoir 8, and the tire air conduct 9. Inserted within secondary axle 22 is the pressure control bar 14, itself connected to control cable 6, which is affixed to frame 1 with binding 25 and surrounded by uncompressible cable housing 26. Connected to air reservoir 8 is the main system air inlet valve 11. As in the previous embodiment, spokes 4 are connected in a standard fashion to rim 12 using nipples 16.

Figure 7:
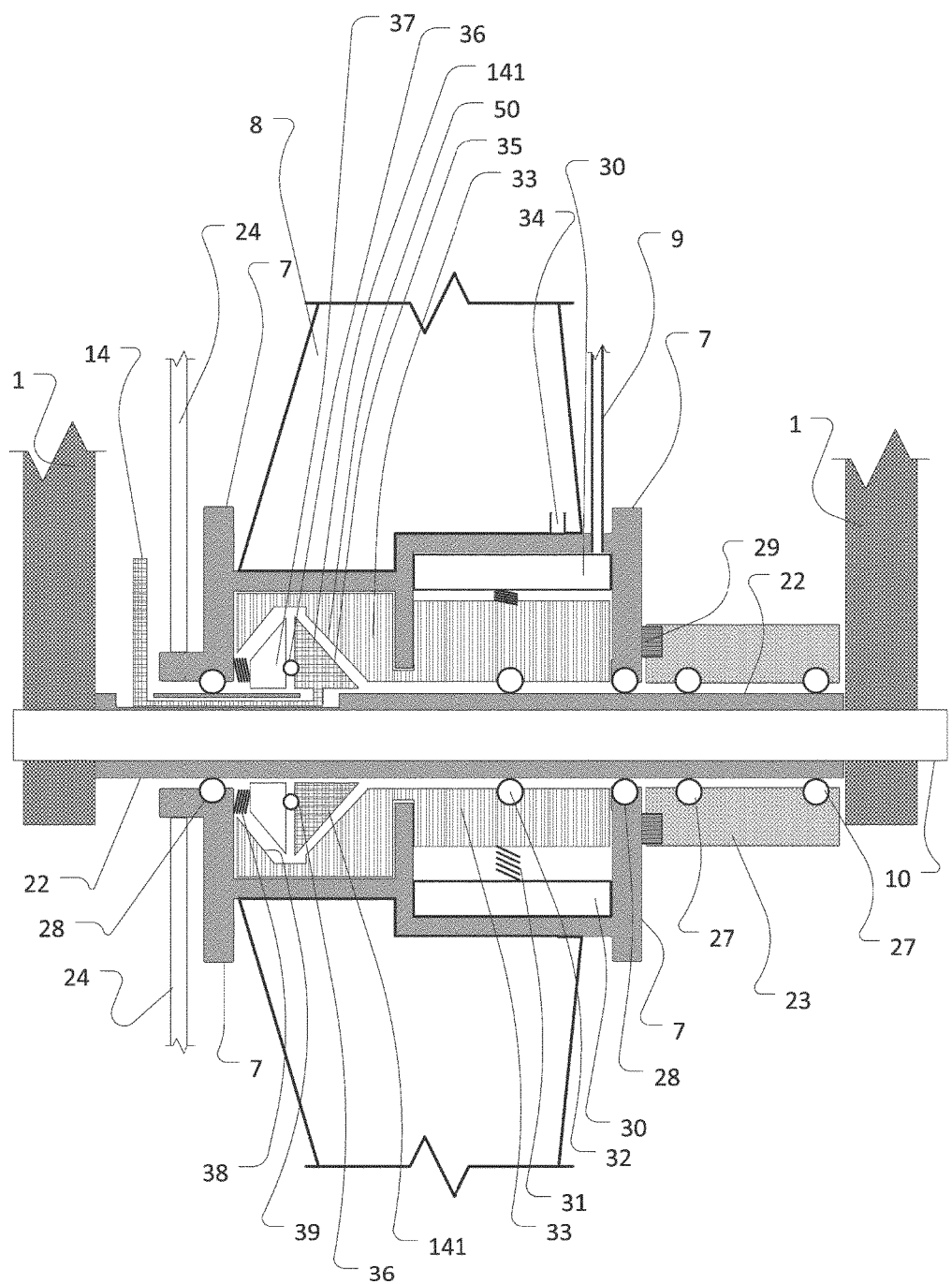
FIG. 7 is a detailed cross sectional view of the middle section of the rear wheel as seen from behind with the present invention in its first embodiment with its mounting on the frame using standardized mechanical interfaces.

In even further detail, and still referring to the first embodiment of the invention, in FIG. 7 there is shown a detailed cross-section of the middle of the back wheel as seen from behind. With main central wheel axle 10 mounted on frame 1. Over-axle 22 slides on axle 10 and supports the hub body 7, which is depicted here in a complete cross section. In particular, hub body 7 rotates freely on over-axle 22 thanks to bearings pairs 28, and it is mechanically connected with free-wheel body 23 via one-way ratchet 29. The free wheel body itself rotates freely on over-axle 22 thanks to bearing pairs 27 and supports the drive train sprockets (not shown). Over-axle 22 features two holes and an internal recess on its top-left-hand side section hosting the pressure control bar 14. Thus it must be appreciated that pressure control 14 does not rotate with the wheel. In the hub-internal side the pressure control bar 14 is of conical section 141, and it slides over over-axle 22 in a left-to-right fashion. Immediately to the left of this conical section 141 there is an annular bearing 36. Running on annular bearing 36 is secondary cone 37, which is directly connected to hub body 7 via circular spring 38. It must be noted then that secondary cone 37 always turns in solidarity with the wheel while keeping its relative position with pressure control bar 14 constant. Surrounding all these internal components is vane-pump axle 33, which turns freely on over-axle 22 thanks to bearings 32. The vane pump itself is composed of the previously mentioned vane-pump axle 33, the multiple vanes 30 loaded via springs 31. According to the current state of the art for vane pumps, the hub-body 7 features a larger cavity on its "bottom" section, while in its "top" section there are two air ports (air-inlets/outlets) 9 and 34, spaced a few to several degrees apart of each other at opposite sides of the narrowest section of the pump.

As depicted before, surrounding the hub body 7 there is air reservoir 8 containing pressurized air.

It will be convenient to note that a same vane pump assembly as described with reference to FIG. 7 can be provided to the second embodiment of FIGS. 3-5. In fact, the difference between the first and second embodiments only lies in a different placement and configuration of the air reservoir.

The working principle according to the first and second embodiments of the invention is as follows: As shown in FIG. 7, depending on the relative rotation of the vane-pump axle 33 with respect to the hub-body 7 and to over-axle 22 it is possible to achieve 3 main working states. If the vane-pump axle 33 is allowed to move freely, then air pressure differential between pump inlets 34 and 9 actuate the pump allowing air to move from the pressurized air reservoir (8 in the first embodiment, 18 for the second embodiment) into the tire 3, effectively inflating it. If the vane-pump axle 33 is made to rotate in solidarity with hub-body 7, the vane pump acts as closed valve and no air flows in any direction, effectively keeping the tire pressure constant. It must be noted that in this state no mechanical loads from the drive-train are required. Finally, if the vane-pump axle 33 is made to be held static with over-axle 22, then, and when the wheel is moving forward, air is forced to flow from air inlet 9 into air inlet 34, effectively deflating the tire and increasing the pressure of air in the air reservoir (8 in the first embodiment, 18 for the second embodiment).

In further detail, as shown in FIG. 7, the pressure control-bar 14 allows for controlling the relative motion of vane-pump axle 33 in following manner: When the pressure control bar 14 is forced towards its most right-hand-side position, then its conical section 141 acts as a clutching surface 35 engaging a corresponding clutching surface 50 on the pump axle 33, forcing the vane-pump axle 33 to remain fixed (static) with respect to over-axle 22. This leads to the tire-deflation state as described above.

When the pressure control-bar 14 is forced towards its left-hand-side position, then thanks to annular bearing 36, the secondary cone 37, which always rotates in solidarity with hub body 7 due to affixed spring 38, engages clutching surface 39 of the vane-pump axle 33. This makes vane-pump axle 33 to rotate in solidarity with hub-body 7, leading to the tire-pressure hold state described above. Finally, if pressure control-bar 14 is set in its central position, the vane-pump axle 33 is allowed to rotate completely freely with respect to hub-body 7 and over-axle 22, leading to the tire inflation state described above.

The remote control operation is achieved as follows: As shown in FIG. 7, FIG. 6 and FIG. 1, control cable 6 is affixed to control lever 61 at one extremity and pressure control bar 14 at the other. It must be noted that pressure control bar 14 is suitably spring loaded. Advantageously, its natural state is in its most-right-hand position thanks to the actuation of spring 38 on secondary cone 37 and annular bearing 36, which itself presses against the conical section 141 of pressure control bar 14. Thus when the control cable 6 is allowed to rest, the system is in tire deflation state. If, via control lever 6 the control cable is pulled for a few millimeters, then the pressure control bar 14 will move to its central position and the system will be in the tire inflation state. Finally, if via control lever 61 the control cable 6 is pulled to its full extent, then pressure control bar 14 is forced to its left hand side position and the system will be in the pressure hold state. Other natural states are possible by changing the loading orientation of the spring 38.

Figure 8:
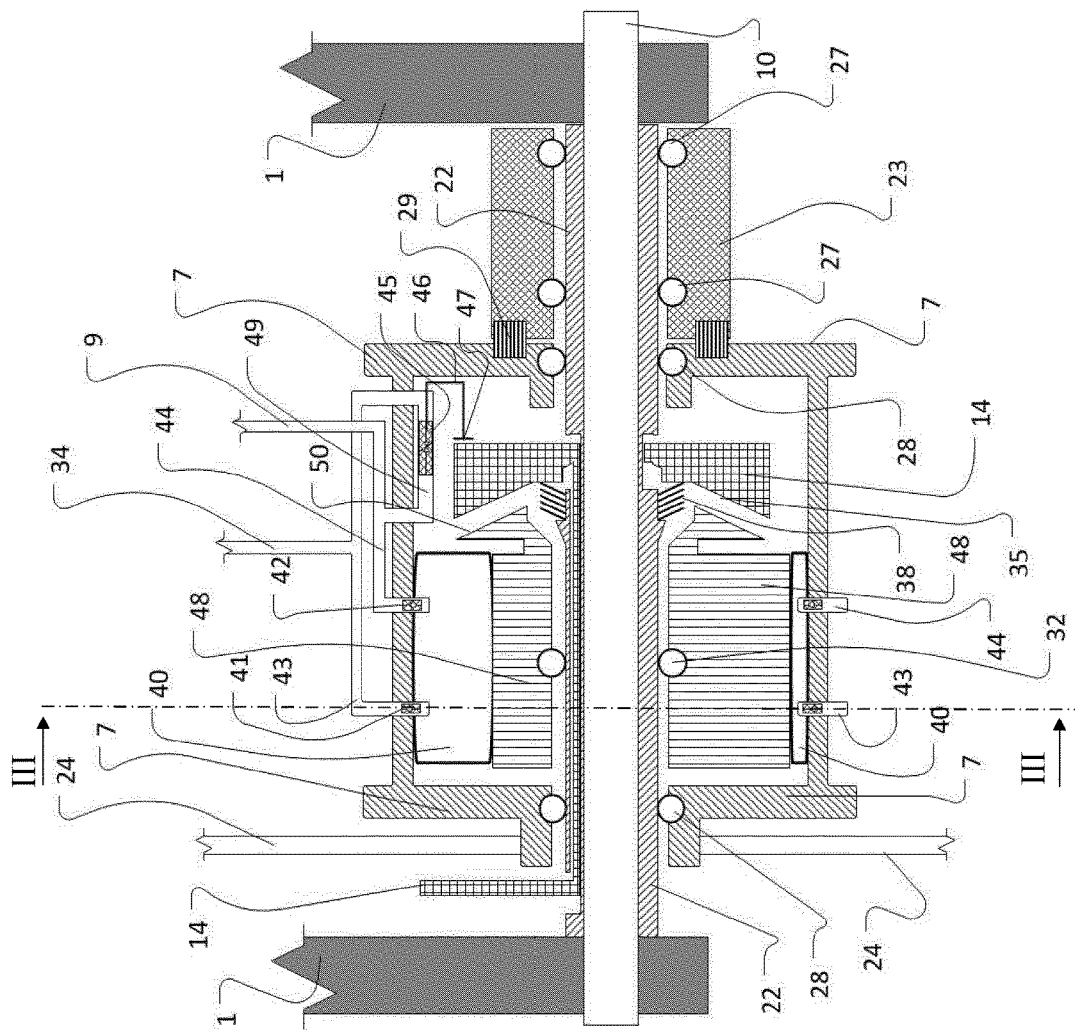
FIG. 8 is a detailed cross sectional view of the middle section of the rear wheel as seen from behind according to a third embodiment of the present invention, with its mounting on the frame using standardized mechanical interfaces.

Referring to FIG. 8, depicted is a third embodiment of the invention. FIG. 8 shows a detailed cross-section of the middle of the back wheel as seen from behind. With main central wheel axle 10 mounted on frame 1. As with the first embodiment of the invention, over-axle 22 slides on axle 10 and supports the hub body 7, which is depicted here in a complete cross section. In particular, hub body 7 rotates freely on over-axle 22 thanks to bearings pairs 28, and it is mechanically connected with free-wheel body 23 via one-way ratchet 29. The free wheel body itself rotates freely on over-axle 22 thanks to bearing pairs 27 and supports the drive train sprockets (not shown). Over-axle 22 features two holes and an internal recess on its top-left-hand side section hosting the pressure control bar 14. Thus it must be appreciated that pressure control bar 14 does not rotate with the wheel.

The third embodiment differs from the first embodiment in that the pump axle (rotor) is shaped into an eccentric 48, which alternatively "compresses" during each rotation a set of flexible chambers 40. The pump eccentric's 48 right-hand-side comprises a conical surface 50. Immediately to its right there is the corresponding conical surface 35 of the pressure control bar 14. The pressure control-bar 14 is always in contact with loading spring 38, which itself is resting against a bulge in over-axle 22. Between pump axle 33 and pressure control bar 14 there are opposite facing clutch-surfaces formed by conical surface 50 of the pump eccentric 48 on the one hand and conical surface 35 of the pressure control bar 14 respectively. Opposite surface 35, across pressure control-bar 14, there is valve actuation surface 47. Directly to its right there is valve actuation lever 46, which operates pressure control valve 45. Lever 46, in conjunction with pressure control valve 45, will enable the air flow to be reversed between the pump ports 34 and 9.

The core of the pump is composed of multiple flexible chambers 40. Each chamber is airtight and advantageously features two unidirectional ports controlled by corresponding check valves: 42 for air inflow and 41 for air outflow. The inflow check valves 42 of all the chambers are connected together into an air channel 44, possibly fashioned as a torus and therefore creating a single and integrated air conduct. Similarly, outflow check valves 41 of all the chambers are also connected into a separate air channel 43, possibly fashioned as a torus and therefore creating a single and integrated air conduct, which is separated from air channel 44. Thereafter, air channel 44 is connected to the tire air inlet 9, and air channel 43 is independently connected to the reservoir air inlet 34. Finally, air channel 44 is also connected to the out port of pressure control valve 45 while air channel 43 is connected to the in port of the pressure control valve 45. The fluid passage between air channels 44 and 43 through control valve 45 forms a bypass 49.

Flexible chambers 40 are configured to remain static relative to hub body 7 (i.e., the pump housing), e.g. by being fixedly connected to the hub body.

Still referring to the third embodiment of the invention, FIG. 9 shows a detailed cross section of the middle of the back wheel perpendicular to FIG. 8 at the high where all the air-outflow check valves 41 are located along section line III-III in FIG. 8. In it all the multiple chambers 40 are depicted in different stages of air compression (those on the right hand-side) and (those on the left hand-side) while the top and bottom chambers are in their most relaxed and compressed states respectively. FIG. 9 also provides a more detailed depiction on how the annular air-channel 43 can be constructed around hub-body 7 and then routed on the "top" section towards the rest of the embodiment. Not depicted here, annular air channel 44 can be constructed in a similar fashion.

The working principle of the third embodiment (FIGS. 8 and 9) remains substantially the same as for the first embodiment, with main differences residing in how the air is compressed by the core of the pump in the tire-deflation state and how the air is allowed to return from the reservoir to the tire in the tire-inflation state. In more concrete terms: As shown in FIG. 8, depending on the relative rotation of the eccentric pump-rotor 48 with respect to the hub-body 7 and to over-axle 22 it is possible to achieve two main working states. When the eccentric pump-rotor 48 is made to rotate in solidarity with hub-body 7, the multi-chamber pump acts as a globally closed valve and no air flows in any direction, effectively keeping the tire pressure constant. It must be noted that in this state no mechanical loads from the drive train are required. On the other hand, when eccentric pump rotor 48 is made to be held static with over-axle 22, and when the wheel is moving forward, air is forced to flow from air inlet 9 into air inlet 34, effectively deflating the tire and increasing the pressure of air in the air reservoir (8 in the first embodiment, 18 for the second embodiment).

A third state of operation is obtained, when the pressure control-bar 14 is allowed to push valve actuation lever 46. In this case, the pressure control valve 45 opens and the air pressure differential between pump inlets 34 and 9 forces the air to move from the pressurized air reservoir (which can be reservoir 8 as in the first embodiment, or reservoir 18 as in the second embodiment) into the tire 3, effectively inflating it.

Hence, in the third state of operation, the pump is bypassed through bypass 49 (valve 45), which connects the pump ports 34 and 9.

In further detail, as shown in FIG. 8, the pressure control bar 14 allows for controlling the relative motion of multi-chamber eccentric pump rotor 48 in following manner: When the pressure control bar 14 is forced towards its most left-hand-side position, then its conical clutching surface 35 engages clutching surface 50, forcing the eccentric pump rotor 48 to remain fixed with respect to over-axle 22. This leads to the tire-deflation state as described above. Conversely when the pressure control-bar 14 is forced towards its right-hand-side position, then it presses against valve actuation lever 46, leading to the tire inflation state described above. Finally, when pressure control bar is set in its middle position, the internal pressure differential of all the flexible chambers 40 hold the eccentric pump rotor 48 in static position relatively with the hub body, which is also allowed to rotate freely on top of over axle 22 thanks to bearing 32. Therefore no air is allowed to flow from the tire 3 to the air-reservoir (8 in the third embodiment, 18 for the second embodiment) or vice versa.

Finally, the remote control of the third embodiment of this invention is achieved as follows: As shown in FIG. 8, FIG. 6 and FIG. 1, control cable 6 is affixed to control lever 61 at one extreme and pressure control bar 14 at the other. It must be noted that pressure control bar 14 can suitably be spring loaded. Advantageously, its natural state is in its most-right-hand position thanks to the actuation of spring 38 on said pressure control bar 14. Thus when the control cable 6 is allowed to rest, the system is in tire inflation state. If, via control lever 6 the control cable is pulled for a few millimeters, then the pressure control bar 14 will move to its central position and the system will be the pressure hold state. Finally, if via control lever 61 the control cable 6 is pulled to its full extent, then pressure control bar 14 is forced to its left hand side position and the system will be in the tire deflation state. Other natural states are possible by changing the loading orientation of the spring 38.

It will be convenient to note that the wheel hub assembly of the third embodiment can be combined with the fluid reservoirs of the first (FIG. 6) and second (FIGS. 4-5) embodiments. In fact, the difference between the first and second embodiments only lies in a different placement and configuration of the fluid reservoir.

Those versed in the state of the art, will appreciate that are many alternative technologies in the field of bicycles control devices for the embodiment of control lever 61, ranging from a simple friction loading, to indexed ratcheted mechanisms. Also as an alternative embodiment, a simple servo control device as those used in hobby remote-control cars or airplanes can be made to actuate control cable 6, while a wireless pressure monitoring device can be mounted on any segment of the air conduct 9. Finally, those versed in the state of the art can easily include a computerized device to actuate the servo control in function of the measuring in the pressure monitoring device, which itself can be controlled via a simple user interface mounted on the handle bar, or from a smart phone device for GPS automatically according to a pre-set program.

The invention is advantageous in its actuating mechanism due to the following drive-train mechanical loading characteristics. A) When the system is in its pressure hold state there are no mechanical loads. Also, B) when the system is its tire-inflation state there a no mechanical loads. It is typical in mountain-biking circuits that rider will desire to increase tire-pressure when climbing, which can thus be achieved at no added energy cost. Finally C) when the system is in its tire-deflation state there is a mechanical load, but it is typical in mountain-biking circuits that the rider will desire to decrease tire pressure when descending at higher speed. Thus most of the necessary mechanical energy is obtained from coasting and no added physical effort from the rider is required.

The invention in its second embodiment is also advantageous in the possibility that the air reservoir 18 can be configured to completely airtight the rim 12 and tire 3 assembly and to provide extra force securing tire beads 21 to the rim 12. This directly enables to mount the tire 3 in a tubeless configuration, and further facilitates operating the bicycle at very low tire pressures by providing extra support in securing the tire beads 21. Also, it must be noted the invention's mode of operation is further advantageous when the air reservoir 18 is made of semi-flexible material, such as those based on rubber and a light-weight cord armature, in the effect that, whenever the tire 3 air pressure is the lowest, the air pressure in air reservoir 18 is the highest, thus providing the strongest support on tire beads 21.

Regarding construction, those versed in the state of the art will appreciate that that most components of this invention can be readily made from light-weight metallic alloys, typically those based on aluminum, titanium, magnesium or steel. While air reservoir 8 can be made of plastic or carbon-fiber or metal alloys depending on the maximum pressure desired. Flexible air-chambers 40 can be made of a rubber compound or other polymers with similar and/or more advantageous properties. In terms of construction and assembly, hub body 7 can be made in two or more pieces to be assembled axially (e.g. along the left hand side wall of the vane pump and annular bearing 36), allowing for the mounting of air reservoir 8 as a single annular component. Also, vane-pump axle 33, pump eccentric 48 and pressure control bar 14 can be made in several parts to facilitate construction, friction-less operation and assembly.

Finally those versed in the state of the art for bicycle technologies will appreciate that although FIG. 6, and FIG. 7 depict a typical implementation for a standard through axle in 12 millimeters for the rear wheel in 170 mm spacing, it is straightforward to extrapolate to other widely used standard for the back and the front wheel, including quick-release 9 mm, the 15 mm through axles and a variety of frame and front-fork spacing. It is also entire possible to completely mirror the system for the front wheel so the pressure control-bar 22 is on the right-hand side of the wheel as seen from the behind the bicycle.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. An assembly for regulating pressure of a pneumatic tire of a bicycle wheel, comprising:
   a fluid reservoir configured for mounting on the wheel, concentric to an axle of the wheel and configured for storing fluid at a higher pressure than the pressure in the pneumatic tire,
   a rotary pump comprising:
      a pump housing;
      a pump rotor;
      a first fluid port configured to be in fluid communication with the pneumatic tire; and
      a second fluid port configured to be in fluid communication with the reservoir; and
   a control means for controlling actuation of the pump rotor, wherein the pneumatic tire, the reservoir, the pump rotor, and the first and second fluid ports are configured to form a closed fluid circuit and wherein the pump rotor is configured for displacing fluid between the first and second fluid ports,
   wherein the pump rotor is configured to rotate relative to the pump housing coaxially with the wheel axle, and the pump housing is configured to rotate relative to the wheel axle.

2. The assembly of claim 1, having a first state of operation wherein the pump rotor is configured for pumping fluid from the first fluid port to the second fluid port, thereby deflating the pneumatic tire.

3. The assembly of claim 2, wherein in the first state of operation, the pump rotor is configured to be kept static relative to the wheel axle, and the pump housing is configured to rotate integrally with a hub of the wheel, such that the pump is actuated by forward wheel movement.

4. The assembly of claim 1, wherein the control means comprises a clutch mechanism, the clutch mechanism comprising a first part fixed to the pump rotor and a fixed to the wheel axle, wherein the first part and the second part are operable to enter into engagement to keep the pump rotor static with the wheel axle.

5. The assembly of claim 1, having a second state of operation, wherein the pump rotor is configured to be maintained in a position such that fluid communication between the first and second fluid ports is blocked, wherein in the second state of operation, the pump housing and the pump rotor are maintained in a static position relative to each other independent of wheel movement.

6. The assembly of claim 5, wherein in the second state of operation, the pump rotor acts as a closed valve between the first and second fluid ports.

7. The assembly of claim 5, wherein the control means comprises a clutch mechanism, the clutch mechanism comprising a first part fixed to the pump rotor and a second part fixed to the wheel axle, wherein the first part and the second part are operable to enter into engagement to keep the pump rotor static with the wheel axle, wherein in the second state of operation, the control means is operable to disengage the first part and the second part of the clutch mechanism.

8. The assembly of claim 1, having a third state of operation, wherein the pump rotor is passive and fluid is configured to be displaced from the second fluid port to the first fluid port, thereby inflating the tire.

9. The assembly of claim 8, comprising a bypass between the first and second fluid ports, wherein the control means are configured for operating the bypass.

10. The assembly of claim 9, wherein the bypass comprises a valve operable to close or open the bypass, wherein the valve is operably coupled to the control means.

11. The assembly of claim 1, having a first state of operation wherein the pump rotor is configured for pumping fluid from the first fluid port to the second fluid port, thereby deflating the pneumatic tire, having a second state of operation, wherein the pump rotor is configured for being maintained in a position such that fluid communication between the first and second fluid ports is blocked, and having a third state of operation, wherein the pump rotor is passive and fluid is configured to be displaced from the second fluid port to the first fluid port, thereby inflating the tire, wherein the control means is operable for changing between the first, second, and third states of operation.

12. The assembly of claim 11, wherein the control means comprises a clutch mechanism for changing between the states of operation and a control cable operably connected to the clutch mechanism.

13. The assembly of claim 12, wherein the control cable is directly or indirectly operated with a servo motor controlled via electronic means.

14. The assembly of claim 1, wherein the pump rotor is a vane pump.

15. The assembly of claim 1, wherein the rotary pump further comprises a plurality of separate fluid chambers interposed between the pump rotor and the pump housing, the chambers being deformable so as to change volume and each of the chambers being fluidly coupled to the first port and to the second port.

16. The assembly of claim 15, wherein the pump rotor is eccentric to the wheel axle.

17. The assembly of claim 16, wherein the pump housing is concentric with the wheel axle.

18. The assembly of claim 15, comprising at least one first check valve between the first port and the plurality of separate fluid chambers.

19. The assembly of claim 15, comprising at least one second check valve between the second port and the chambers.

20. The assembly of claim 1, comprising a bicycle wheel, wherein the bicycle wheel comprises a wheel hub, wherein the pump housing is integral with the wheel hub.

21. The assembly of claim 20, comprising the fluid reservoir, wherein the reservoir is secured on the wheel hub and extends between left-hand and right-hand wheel spokes.

22. The assembly of claim 20, comprising the fluid reservoir, wherein the reservoir is secured between a rim of the wheel and the pneumatic tire.

23. A bicycle comprising the assembly of claim 20.

* * * * *